UNITED STATES PATENT OFFICE.

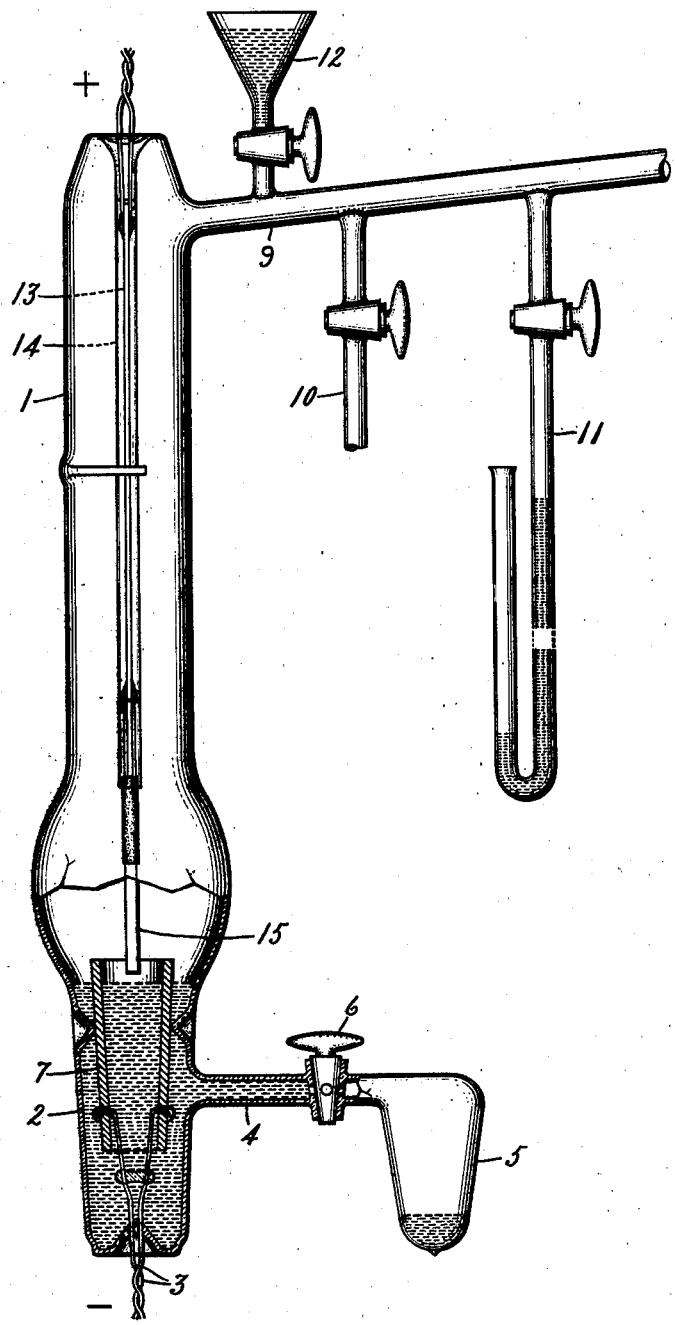

EZECHIEL WEINTRAUB, OF SCHENECTADY, NEW YORK, ASSIGNOR TO GENERAL ELECTRIC COMPANY, A CORPORATION OF NEW YORK.

TREATMENT OF REFRACTORY MATERIALS.

997,879.   Specification of Letters Patent.   Patented July 11, 1911.

Application filed December 4, 1906. Serial No. 346,253.

*To all whom it may concern:*

Be it known that I, EZECHIEL WEINTRAUB, a citizen of the United States, residing at Schenectady, in the county of Schenectady, State of New York, have invented certain new and useful Improvements in Treatment of Refractory Materials, of which the following is a specification.

This invention relates to glowers or incandescing bodies for lamps, furnaces, and other apparatus, and to methods of purifying and treating refractory materials for use in the construction of such bodies.

My invention includes new methods for the purification of boron compounds and for the production therefrom of coherent, homogeneous and conductive boron, also to a furnace treatment applicable to the fusion of boron.

The usual method for producing boron includes the reduction of boric anhydrid with magnesium, the general process being to heat a mixture of magnesium with an excess of boric anhydrid. This reaction is accompanied by the production of magnesium borate and by the formation of other compounds. The resultant product, therefore, contains a relatively high percentage of material other than boron. The usual washing with water and hydrochloric acid decreases the percentage of impurity, but so far as I am aware, has never yielded a product which could, in the chemical sense, be termed "pure boron". I have found, however, that this impure product can be greatly improved by what may be termed "fractional decantation", consisting in grinding the product with water or hydrochloric acid and then decanting off the top of the liquid before complete precipitation has occurred. I have found that boron has a greater specific gravity than the impurities such as magnesium borid. By repeating this treatment, I can reduce the proportion of impurities by several per cent., and in fact, can secure a resultant product quite different in appearance and in properties from that heretofore obtained.

To secure conductive boron from the material above described or from the raw product of the reaction after due purification, I may compress the impure boron above described into the form of a stick or rod, say six centimeters long and five millimeters in cross-section. This stick is then highly heated in a vacuum to dissociate and drive off various of the impurities. For this heating treatment I may conveniently utilize the vacuum furnace described in United States patent to Arsem, No. 785,535, March 21, 1905. This heat treatment dissociates any magnesium borid which may be present and drives off the magnesium. Similarly, it dissociates or volatilizes any boron hydrid. In case any $B_2O_3$ or any borate is present, that also passes off by direct volatilization. The heat treatment may be continued for several hours at a temperature of say 1200° C. without any danger of contaminating the boron by the carbon of the resistance heater used in the furnace above mentioned. I have mentioned the purification of the boron by this heating in the vacuum, but I find that another very important change takes place, and that the stick, which before treatment was a non-conductor, becomes a relatively good conductor of electricity. This surprising result is of great commercial importance, for the boron thus produced is radically different from that of the prior art as described in text books and technical literature. I do not wish to be limited to any particular theory for the conversion of this stick from a non-conductive to a conductive condition, but such is the fact. The next step in my process consists in melting down this conductive boron by heating it as anode in a vacuum arc. The apparatus for carrying out this step is illustrated in the drawing forming part of this specification, and is hereinafter described in detail.

A hermetically sealed envelop 1 of glass is provided at its bottom with a cup-shaped depression 2 capable of holding a suitable quantity of mercury for use as the cathode of a mercury arc. Suitable lead-wires 3 pass through the glass envelop and serve as means for connecting the mercury to a source of energy. A small tube 4 leads out of this cup-shaped depression or cathode chamber 2 into a well 5 which serves as a receptacle into which mercury may be drawn to lower the surface of the mercury cathode as occasion may require. A suitable stop cock 6 is provided for controlling the flow of mercury into this well. A bottomless cup 7 of alumina is secured in the mercury chamber and projects above the surface of the mercury and thereby prevents wandering of the cathode spot over against the side of the glass envelop where it might do damage by excessive heating. The upper end of the glass envelop is connected by a tube 9 with a good vacuum pump, and this tube also communicates through suitable valves with a source of hydrogen 10 or other gas, whereby this gas may be admitted to the arc chamber after the latter has been exhausted. A pressure gage 11 serves to indicate the state of the vacuum within the chamber and a small funnel 12 furnishes a ready means for the introduction of mercury through tube 9 into the main chamber of the furnace. From the top of the furnace chamber 1 depends a rod or wire 13 surrounded by a protective sleeve 14 and supporting at its lower end a carbon tube or sleeve within the end of which is secured one end of a stick or rod 15 of the material to be treated or melted.

To start the apparatus into operation, I exhaust the main chamber 1 and the mercury well 5 by means of the vacuum pump, and I then introduce sufficient mercury through funnel 12 to raise the level in the alumina cup 7 until contact is made with the lower end of the stick 15 to be treated. I next introduce a small quantity of gas inert with respect to the material to be treated, as I have found that this addition concentrates the arc on the lower end of the material under treatment and prevents the tendency which the arc would otherwise have of running to the lead-wire 13, this being particularly the case if the material is of lower conductivity than the lead-wire. Various gases may be introduced to produce this concentration of the arc, and in general I consider that the effect is due to the increased resistance offered to the passage of the arc through the gaseous medium of the envelop, by virtue of which the arc takes the shortest path to the anode and is thereby concentrated on the end thereof. If the stick under treatment consists of boron I may use hydrogen as the gas; and although the quantity may vary considerably, I prefer to use hydrogen at a pressure of from two and a half to fifteen centimeters of mercury.

To start the arc between the mercury cathode and the solid anode 15, I open the stop cock 6 and allow a small quantity of the cathode mercury to flow through into the well 5 and thereby lower the level of the mercury in cup 7. This produces an arc which can be drawn out to the proper length by further subtraction of the mercury from the cathode.

The heating action of the mercury arc is so intense and so concentrated that it fuses down the end of the stick into a bead or globule, and I am thereby enabled to obtain relatively large quantities of pure boron in a compact, homogeneous and thoroughly fused mass.

The standard chemical text books describe boron as being a non-conductive material which vaporizes at high temperatures without melting. Such statements in no wise apply to the boron I have produced as above described, for it is a relatively good conductor of electricity, is a dense and solid body and undergoes complete fusion without apparent vaporization.

In the furnace treatment above described, the introduction of an inert gas to secure concentration of the arc on the anode under treatment furnishes an easy means for treating boron.

Pure conductive boron, as above described, may be used for a variety of purposes, and may be shaped into rods or glow bodies for use in incandescent lamps and furnaces. This may be effected by grinding up the fused globule produced in the vacuum arc, and then compressing the powder so formed into rods of suitable size and shape, either with or without the use of binding material. I may use no binding material whatever, as I am thereby enabled to keep the conductor free from any ingredients which might possibly lower the operating temperature. In case a binding material is used I prefer to employ one, such as paraffin, having the property of volatilizing out without leaving carbon in the residue, or at least one leaving so little carbon that the properties of the boron conductor are not sensibly affected thereby.

Other methods may be used for working the boron into rods or glow bodies after the boron is in a pure condition. For instance, I may use the process invented by W. D. Coolidge, disclosed in his application No. 316,006, filed May 9, 1906, which consists in rubbing the finely divided refractory material into a warm and plastic amalgam containing approximately equal parts by weight of cadmium and mercury. The boron may be added to the extent of several per cent. by weight or, in fact, until the amalgam is completely impregnated. The material so produced is extruded warm through a die and is then heated by current in a vacuum, to drive out the cadmium and mercury and leave a coherent conductor of the refractory material. Such a process is not only applicable to slender wires, but is also applicable to rods or glow bodies of very considerable cross-section.

In a divisional application, Serial No. 401,811, filed November 12, 1907, claims are made on the apparatus herein disclosed. In another divisional application, Serial No. 524,948, filed Oct. 27, 1909, claims are made on a process wherein this apparatus can be used in the treatment of refractory material. In another divisional application, Serial No.

585,391, filed October 5, 1910, claims are made on boron as an article of manufacture.

What I claim as new and desire to secure by Letters Patent of the United States, is,—

1. In the production of boron, the method which consists in reducing boric anhydrid with magnesium, purifying the resultant product by washing, grinding the material thus obtained with a liquid and decanting off the top of the liquid before complete precipitation of the material suspended therein.

2. As a step in producing boron from the reduction product obtainable when boric anhydrid is reduced with magnesium, the method which consists in suspending said product in water and then removing the lighter part of said suspension by fractional decantation.

3. The process which consists in heating impure boron in a vacuum to dissociate and drive off impurities therefrom.

4. The process which consists in treating impure boron in a vacuum to drive off impurities and render said boron conductive.

5. The process which consists in heating impure boron until impurities are dissociated and driven therefrom and said boron becomes conductive for electricity.

6. The process which consists in rendering impure boron conductive by heat treatment, mounting said boron as anode in an arc and fusing down said boron into a compact body.

7. The process which consists in heating conductive boron as anode in a mercury vapor arc to produce changes therein.

8. The process which consists in compressing impure boron into a stick, heating in a vacuum to dissociate and drive off impurities and render said boron conductive, and heating as anode in a mercury vapor arc to fuse said boron.

9. The process which consists in producing conductive boron, and fusing said boron into a compact body.

10. The process of making pure boron which consists in heating impure boron in an inert environment until the impurities are driven off.

11. The process of making boron which consists in heating boron compounds in an inert environment until boron is produced therefrom.

12. The method which consists in purifying impure boron by heating it to high temperature in a mercury arc.

13. The method which consists in purifying and fusing impure boron by heating it as anode for a mercury arc in hydrogen.

14. The process of making fused boron, which consists in heating impure boron in a vacuum to drive off impurities and heating as anode for a mercury arc in hydrogen until said boron is fused.

15. The process which consists in mounting a body of conductive boron as anode in a hermetically sealed chamber, and producing an arc thereto in an atmosphere of inert gas to fuse said boron body.

16. The method which consists in reducing boric anhydrid with magnesium, purifying the resultant mixture by washing, separating from said mixture the impure boron, pressing this boron into a rod and heating in a vacuum furnace to distil impurities and render said boron conductive, and then fusing said boron in a mercury vapor furnace.

17. The method which consists in the production of impure boron, heating said material in a vacuum to render it conductive, and heating to a higher temperature as anode in an arc.

18. The method which consists in heating impure boron to render it conductive, and heating to a high temperature to purify.

In witness whereof, I have hereunto set my hand this 3rd day of December, 1906.

EZECHIEL WEINTRAUB.

Witnesses:
 BENJAMIN B. HULL,
 HELEN ORFORD.